Patented June 17, 1930

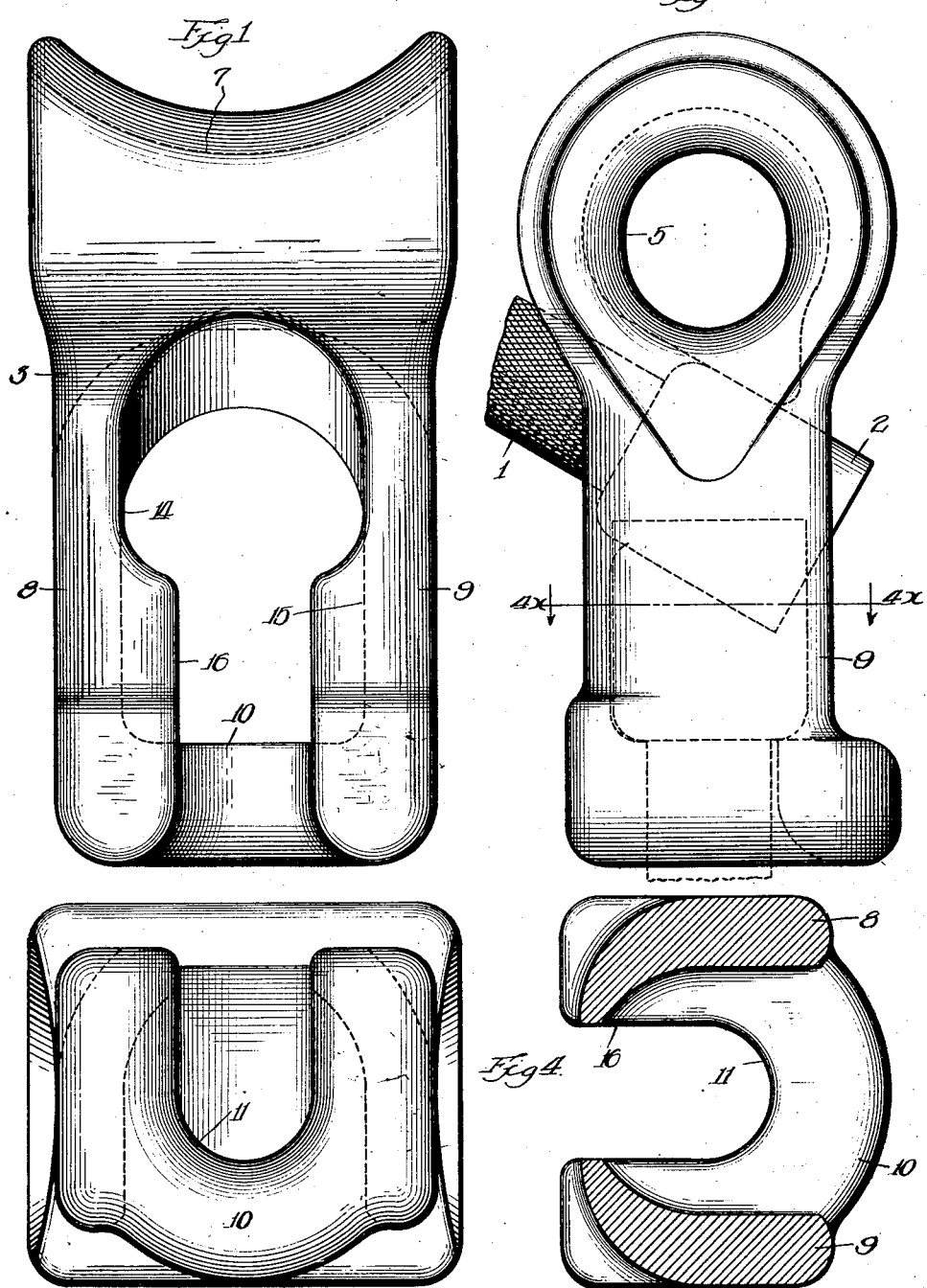

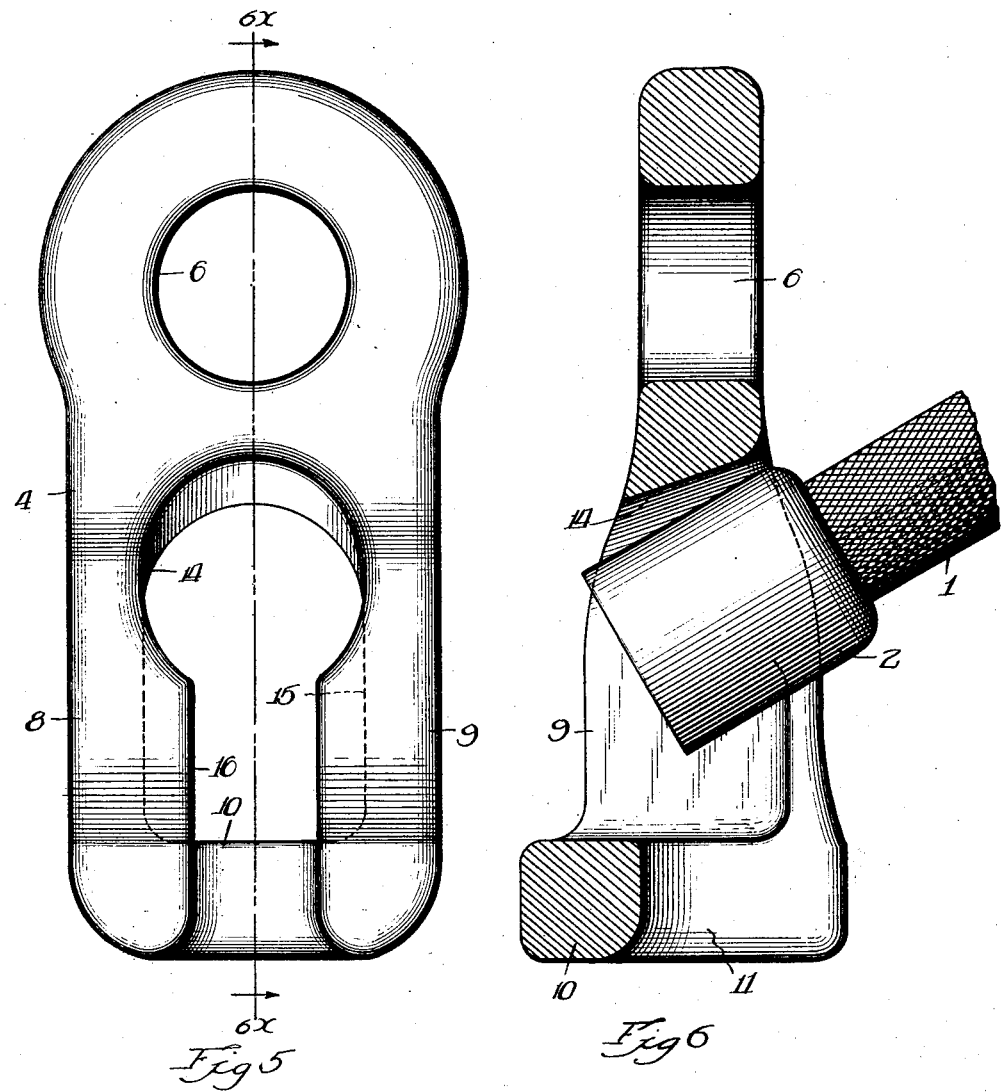

1,764,135

UNITED STATES PATENT OFFICE

DONALD H. YOUNG, OF BERKELEY, CALIFORNIA, ASSIGNOR TO AMERICAN MANGANESE STEEL COMPANY, OF CHICAGO, ILLINOIS, A CORPORATION OF MAINE

CHOKER HOOK FOR LOGGING INDUSTRY

Application filed December 24, 1928. Serial No. 328,130.

This invention relates to logging hooks comprising either choker hooks or butt hooks for connecting the ends of a cable line.

In hauling logs it is customary to use a cable or choker line consisting of a wire rope having an enlarged end or ferrule for connecting to hooks. One end of the cable is attached to a butt end hook connected to the hauling means. The cable passes around the logs to be hauled and its other end is connected to a choker hook running on the cable line. These hook members are subjected to severe commercial use necessitating substantial construction and freedom from projections that might catch on obstructions. The hooks should be so designed that the connections to the cable ends may be easily and readily made but these connections should not be capable of accidental disengagement while in use.

The purpose of this invention is to provide a hook of improved design having means for engagement with a cable and designed to prevent the accidental displacement or disengagement of the parts. The hook is constructed in unitary form having no movable parts.

It is further an object of this invention to provide a hook whereby the cable must be turned more than ninety degrees from its normal line of pull to permit the axial entrance of the cable enlargement into the hook.

It is further an object of this invention to so construct the hook that the connection may be easily made by passing the cable enlargement through the hook, turning the cable to a position in a normal line of pull and allowing the pull on the cable to seat the cable enlargement in place.

Further objects and advantages will be easily apparent as the improvement is fully described.

Figure 1 shows a front elevation of a choker hook involving the improved construction.

Figure 2 is a side elevation of Figure 1 and shows the cable enlargement in the act of being inserted therein and, in dotted lines, the cable enlargement in its place in the seat.

Figure 3 is a bottom elevation of Figure 1.

Figure 4 is a horizontal section on line 4—4 of Figure 2 looking downward, but does not show the cable.

Figure 5 shows a front elevation of a butt hook embodying the improved construction.

Figure 6 is a side elevation of Figure 5 and shows a cable in the act of being inserted.

In order to clearly described the construction, the words "upper," "lower," "forward," "rearward," etc., as used in specification and claims, refer to the position of the choker hook, as shown in Figure 1, or the butt hook, as shown in Figure 5, but it is apparent that the hooks may be used in any position and these words should not be construed as limitations.

The usual cable 1 having an enlargement or ferrule 2 upon its end is shown. The length of the enlargement 2 is shown greater than its diameter but other relative dimensions could be utilized. In Figures 1 to 4 a choker hook 3 is shown formed in one piece and usually forged or cast from steel. The choker hook 3 is shown having substantially smooth sides and rounded edges to prevent its catching on obstructions while in use. At the upper end of the choker hook is provided a reeved opening 5 for the passage of the cable and having curved sides 7 to diminish the friction on the cable while in use. Extending downwardly from the upper end are shown two sides 8 and 9 joined at their lower ends by a U-shaped seat 10 thus leaving an opening 11 on the longitudinal axis of the hook for the passage of the cable 1. On the forward side and between the side members 8 and 9 is an angular opening 14 extending downwardly at an angle to the seat portion. The angular opening 14 forms an entrance opening for the cable enlargement and is substantially adjacent the upper end of the hook 3. There is also shown a slot 16 substantially equal in width to the cable diameter and connecting the angular opening 14 to the axial opening 11 in the seated portion 10. There is thus formed an interior opening from the upper end to the seat portion 10 in which the cable enlargement 2 may be turned to seated position. At the rearward side is provided an opening 15.

From the construction thus far described, it is apparent that the cable enlargement 2 may be passed axially through the entrance opening 14 and then turned together with the cable 1 until it is seated, as shown in dotted lines in Figure 2. During the turning movement the cable 1 passes through the slot 16. It is also clear that the rearward opening 15 allows the operator to pass the cable enlargement 2 axially through the entrance opening 14 and past the hook 3 until the slack in the cable 1 is drawn up and the cable 1 is seated in the axial opening 11; then, upon a pull on the cable, the enlargement 2 will automatically seat itself in place. It is also clear that in order to disengage the parts the cable 1 must be turned through an angle more than ninety degrees from its normal line of pull until it is in line with the angular opening 14 before the cable enlargement 2 may be removed from the hook 3. This substantial angle of turn prevents accidental disengagement of parts while in use. An upward thrust on the cable 1 will not force the enlargement 2 out through the angular opening 14 since the cable portion adjacent to the enlargement would have to bend and is prevented from so doing by the closed seat portion 10. Instead, an upward thrust on the cable 1 moves the enlargement 2 upward until it strikes the closed end of the interior chamber. The cable may then bend through the slot 16 but will not move far enough to permit the disengagement of the cable end from the hook. The open side 15 is an important feature of this invention since it allows a very quick connection of the cable to the hook and makes for a construction that is narrower in width and lighter in weight than some of the devices in use.

In Figures 5 and 6 is shown a butt end hook 4 having an opening 6 in its upper end for attachment to hauling means. The construction is otherwise similar to the choker hook in Figures 1 to 4 and its operation will be apparent.

I claim:

1. In combination, a cable provided with a retaining enlargement at its end, a choker hook comprising a body, said body having a reeved opening at one end through which said cable is extended and having a vertical axial opening closed at the reeved end but open at the opposite end, said axial opening being slightly larger in diameter than the cable enlargement for the greater portion of its length in the interior of the body, but narrowed substantially to the cable diameter at the end of the body, said body having an angular opening in one side adjacent the reeved end having its axis directed toward the center of the body and being slightly larger in diameter than the cable enlargement, said body having a slot in the same side as the angular opening extending from the angular opening to the axial opening and to the end of the body, said slot being slightly larger than the cable diameter.

2. In a logging hook, a body having an opening at its upper end and a seat portion at its lower end, said body having an entrance opening on the forward side adjacent the upper opening directed downward at an angle to the seat portion, said body having a connecting slot extending from the entrance opening to the seat portion and said body having an interior chamber open on the rear side, whereby a cable enlargement may be passed axially endwise through the entrance opening and turned more than ninety degrees with the cable passing through the slot to a position in which the cable enlargement is seated.

3. A logging hook comprising a unitary body having a transverse cable opening at one end and a U-shaped seat for a cable enlargement at the opposite end, said body having an angular entrance opening on one side directed toward the seat portion whereby the cable enlargement may be inserted only in an axial direction and at an angle more than ninety degrees from a seating position, said body having a connecting slot from the angular opening to the U-shaped seat and said body being open at a side opposite the entrance side.

4. A logging hook comprising an integral body member having an interior socketed chamber adapted to receive a cable enlargement and permit the turning movement thereof within said chamber, said socketed chamber being closed at the upper end of said body by an eye adapted to receive a cable, the axis of said eye being in the plane of the axis of said socketed chamber, said body including at the lower end a seat portion for the cable enlargement, said body having three walls, one of said walls having an angular opening therethrough adjacent the eye adapted to receive the cable enlargement and direct it angularly downward towards the axis of said socketed chamber, said wall also having a slot extending downward from said angular opening and terminating in an axial opening in said seat portion, said slot being adapted to permit the passage of the cable but retain the cable enlargement, the side of said body opposite the wall having the angular opening being entirely open to permit the free passage of the cable enlargement through the body of said hook.

Signed at Berkeley, California, this 11th day of December, 1928.

DONALD H. YOUNG.